United States Patent

[11] 3,581,020

[72] Inventors Morris Ribner;
Alfred M. Hestad, Chicago, Ill.
[21] Appl. No. 852,172
[22] Filed Aug. 22, 1969
[45] Patented May 25, 1971
[73] Assignee International Telephone and Telegraph Corporation New York, N.Y.

[54] RINGING TONE DISTRIBUTION CIRCUITS
7 Claims, 2 Drawing Figs.

[52] U.S. Cl. .......... 179/84R, 179/15BY, 179/18HB
[51] Int. Cl. .......... H04m 1/26
[50] Field of Search .......... 179/84, 18 (HB), 15 (BY)

[56] References Cited

UNITED STATES PATENTS 3,223,787 12/1965 Jorgensen .......... 179/84R
3,443,033 5/1969 Louis .......... 179/15BY

*Primary Examiner*—William C. Cooper
*Assistant Examiner*—William A. Helvestine
*Attorneys*—C. Cornell Remsen, Jr., Walter J. Baum, Percy P. Lantzy, J. Warren Whitesel, Delbert P. Warner and James B. Raden

ABSTRACT: A logic system is provided for supplying ringing tone in successive bursts of one-second duration to each of four bays. The system provides the tone in a repetitive cycle so that the load of only one bay is placed on the source at one time. The system provides a period between each one-second burst to enable relay contacts to be opened and closed in the absence of ringing tone.

INVENTOR
MORRIS RIBNER
ALFRED M. HESTAD
BY Delbert A. Warner
ATTORNEY

RINGING TONE DISTRIBUTION CIRCUITS

The present invention relates to the provision of ringing tone in a telephone switching system. It relates particularly to the provision of ringing tone to each of a plurality of bays in a repetitive cycle so that the load of only one bay is placed on the source at any given time and also related relays are energized and deenergized during periods when ringing tone is excluded from the relay contacts.

A source of current is provided in telephone switching systems for use in signaling called parties. With many existing telephone systems, relatively large sources of current at a potentially dangerously high voltage are used to provide sufficient current to enable the system to signal each of a number of called parties. In systems where calls are frequent, such a ringer can be rather massive as well as expensive. In other systems, a plurality of sources of ringer current are provided so that no single large ringer is required. Such systems reduce the need for large current sources at the cost of a number of smaller machines and the supporting equipment. In ringing systems where a metallic connection is desired, relays may be used. The contacts of such relays are subject to damage if voltage exists across the contacts when they open and close.

It is an object of the present invention to avoid the use of a single large machine and, at the same time, to avoid the need for a plurality of small machines. It is another object of the invention to provide improved means for eliminating the relatively high potential across relay contacts in order to prevent contact damage from electrical discharges.

The foregoing objects and others ancillary thereto are accomplished in a preferred embodiment of the present invention by use of logic circuits. These circuits, in response to a tone request signal, route ringing tone sequentially to a plurality of bays from a single source of ringing tone and prevent the application of ringing tone across relay contacts as they open or close.

Figure 1:
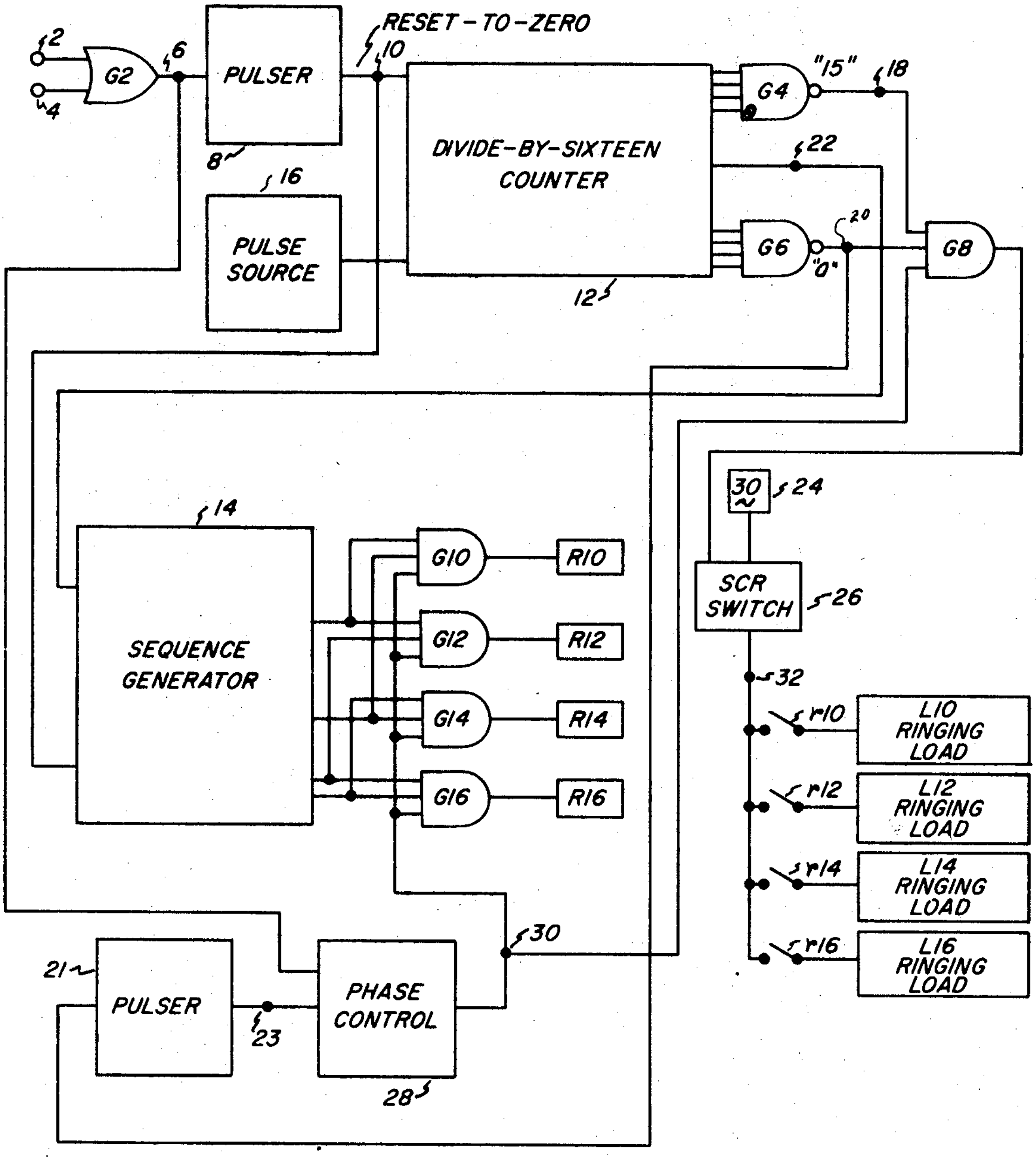
Figure 2:
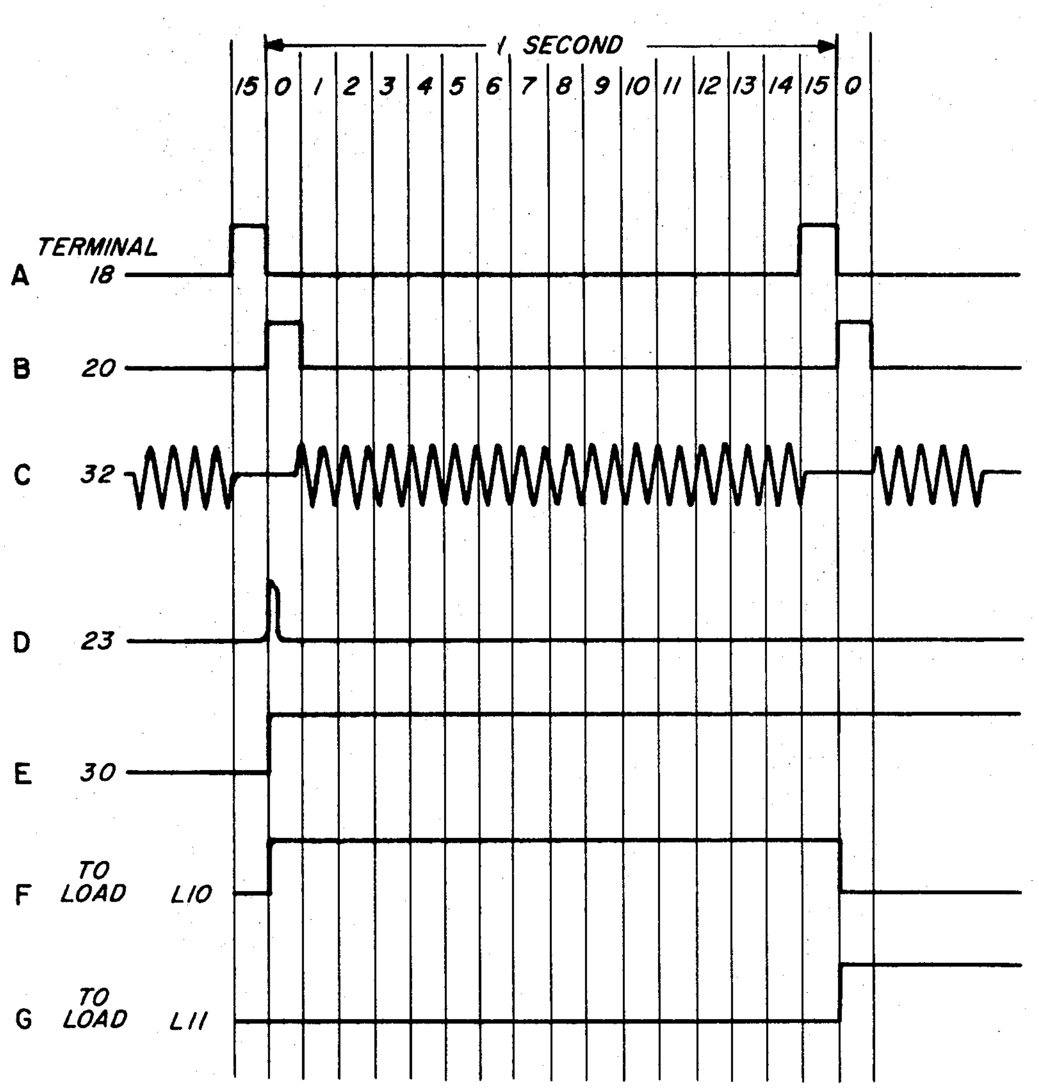

The above mentioned and other features and objects of this invention and the manner of obtaining them will become more apparent, and the invention itself will be better understood by reference to the following description of an embodiment of the invention taken in conjunction with the accompanying drawings, in which FIG. 1 is a block diagram depicting an embodiment of the invention, and FIG. 2 is a timing chart showing relationships between signals as they would be generated by a circuit in accordance with the diagram of FIG. 1.

Turning to FIG. 1, a tone request signal (ground) presented on either terminal 2 or 4 will operate an OR gate, G2, providing an output over line 6 to a pulser at 8. The pulser may be formed by a conventional circuit, such as a differentiator, which is able to provide a single sharp output pulse in response to a prescribed change in input voltage level. The output of the pulser will be supplied over terminal 10 as a "set" or "reset" pulse to a divide-by-16 counter at 12 and also to a sequence generator indicated by block 14. The counter and the generator will then both be set, or reset, to their respective zero states when this pulse arrives.

The divide-by-16 counter may be of a familiar design employing four multivibrators. Its function is to accept pulses from a pulse source, shown by block 16, and to provide a plurality of timing pulses at various output terminals. The time relationship of two of these pulse is indicated in FIG. 2 as the 15th and 0th pulses, respectively. The 15th pulse is available on terminal 18 from a NAND gate, G4, which responds to the presence of a logic "1" on each terminal of the four counter multivibrators corresponding to the presence of the binary 15, or 1111. In a similar way, the 0th pulse is available on a terminal 20 from a NAND gate, G6, which responds to the presence of logic zero on each of four terminals of the counter corresponding to the presence of the binary member 0 on each of the four terminals. An additional signal is available from the counter on terminal 22. The signal on terminal 22 is taken from the counter at the same point as one of the input signals to Gate G4 and is in the form of a pulse train having a period 16 times that of the pulse source 16.

The output signals from the counter 12 are supplied from terminals 18, 20 and 22 to the elements 14, 21 and G8 over the lines shown in FIG. 1. The 0th pulse is applied from terminal 20 to another pulser, indicated by a block 21 which can also provide a delay. The output from this pulser, which may be similar to pulser 8, is a pulse of the form shown in FIG. 2D which is formed at the beginning of the 0th pulse. This spike is fed over terminal 23 to the phase control device at 28. The spike pulse is used within block 28 to set a multivibrator (not shown) in a first state and provide an output as indicated in FIG. 2E. This output is supplied over terminal 30 to the gates G8, G10, G12, G14 and G16. The purpose of this phase control is to prevent the initiation and termination of the tone request signal, which occurs a random, from causing immediate relay switching during the presence of ring tone prior to the cutoff of the SCR gate on termination and after turn-on for initiation.

The sequence generator 14 includes two multivibrators (not shown) which are reset to a first state when a signal is received from the pulser 8. The signal from terminal 22 is taken from the last stage of the counter 12 and, therefore, consists of alternate positive and ground pulses having a duration of 16 times the period of the pulses from pulse source, 16. The sequence generator is arranged to be made operable on the occurrence of the positive going portion of the original pulse from terminal 22 which means that the sequencer may be operated one-half the time. The sequence generator may be formed by two pairs of multivibrators which supply output signals over four lines to decoding gates G10, G12, G14 and G16, as shown in FIG. 1. Each of the gates is energized for a period of very nearly one second and contacts of the related relays R10, R12, R14 and R16 are opened and closed during the periods corresponding to the 15th and 0th count when no voltage is available over the switch 26 from the 30; Hertz source at 24, as described in the following paragraphs. In this way, ringing current is supplied to each ringing load in succession without inflicting damage on the relay contacts *r10*, *r12*, *r14* and *r16*.

The 30 Hertz signals from block 24 are supplied, typically, at 110 volts over a switch formed by a pair of silicon controlled rectifiers at 26. The SCR switch is controlled from the gate G8 which is controlled, in turn, by the signals on terminals 18, 20 and 30. These signals cause the gate to permit current to flow from the generator 24 in the manner indicated in FIG. 2C. From the figure it is clear that the SCR switch permits flow during the greater part of each second, but that it is switched "OFF" upon the incidence of pulses 15 and 0 respectively from gates G4 and G6, during which time the relay contacts open and close to respective loads, as indicated, by way of example in FIG. 2 at F and G.

While the principles of the invention have been described above in connection with specific apparatus and applications, it is to be understood that this description is made only be way of example and not as a limitation on the scope of the invention.

We claim:

1. A ringing tone distribution circuit for supplying ringing tone to a plurality of loads comprising
   - first means responsive to a tone request signal for providing reset signals,
   - a pulse source providing a sequence of pulses,
   - means coupled to receive said sequence of pulses and said reset signals and, in response thereto, to provide a plurality of control signals,
   - a source of ringing tone,
   - first switching means responsive to said reset signals and to selected ones of said control signals to connect loads sequentially to the source of ringing tone, and
   - second switching means coupled between the source of ringing tone and contacts of the first switching means, said second switching means responding to selected ones of said control signals for periodically interrupting the ringing tone to said first switching means.

2. A circuit as claimed in claim 1, in which the means for providing a plurality of control signals includes a divide-by-16 counter and a plurality of gate circuits.

3. A circuit as claimed in claim 1, in which the first switching means includes counter means and a plurality of gate circuit for connecting the loads sequentially to the source of ringing tone.

4. A circuit as claimed in claim 1, in which the first switching means includes counter means and a phase control circuit coupled to a plurality of gate circuits for connecting the loads sequentially to the source of ringing tone.

5. A circuit as claimed in claim 1, in which the first switching means includes a plurality of relays, each of which is operable in sequence to close "make" contacts and complete connections between the sources of ringing tone and the loads.

6. A circuit as claimed in claim 1, in which the second switching means includes a gate circuit and a silicon controlled rectifier and said gate circuit is coupled to respond to the selected ones of said control signals by periodically breaking connections over a path through the silicon controlled rectifier and interrupting the ringing tone.

7. A circuit as claimed in claim 1, in which the first switching means includes counter means and a phase control circuit coupled to a plurality of gate circuits for connecting the loads sequentially to the source of ringing tone, and said first switching means include means for assuring that connections to the load are made only in the absence of ringing tone despite random tone request signals.